(12) United States Patent
Lymberopoulos et al.

(10) Patent No.: US 8,849,731 B2
(45) Date of Patent: Sep. 30, 2014

(54) CONTENT PRE-FETCHING FOR COMPUTING DEVICES

(75) Inventors: Dimitrios Lymberopoulos, Bellevue, WA (US); Oriana Riva, Redmond, WA (US); Karin Strauss, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 287 days.

(21) Appl. No.: 13/403,827

(22) Filed: Feb. 23, 2012

(65) Prior Publication Data

US 2013/0226837 A1 Aug. 29, 2013

(51) Int. Cl.
*G06F 15/18* (2006.01)

(52) U.S. Cl.
USPC .......................................................... 706/12

(58) Field of Classification Search
CPC combination set(s) only.
See application file for complete search history.

(56) References Cited

U.S. PATENT DOCUMENTS

| | | | |
|---|---|---|---|
| 6,820,116 B1 | 11/2004 | Pyhalammi et al. | |
| 7,363,035 B2 | 4/2008 | Reilly | |
| 7,757,002 B2 | 7/2010 | Penton et al. | |
| 7,809,818 B2 | 10/2010 | Plamondon | |
| 8,166,255 B2 * | 4/2012 | Shen et al. | 711/150 |
| 8,201,024 B2 * | 6/2012 | Burger et al. | 714/42 |
| 8,255,603 B2 * | 8/2012 | Chung et al. | 710/268 |
| 8,285,904 B2 * | 10/2012 | Strauss et al. | 710/268 |
| 8,356,130 B2 * | 1/2013 | Strauss et al. | 710/263 |
| 8,386,836 B2 * | 2/2013 | Burger et al. | 714/6.1 |
| 8,458,514 B2 * | 6/2013 | Harris et al. | 714/6.13 |
| 8,521,661 B2 * | 8/2013 | Wang et al. | 706/12 |
| 8,521,981 B2 * | 8/2013 | Strauss et al. | 711/167 |
| 8,548,497 B2 * | 10/2013 | Lymberopoulos et al. | 455/456.1 |
| 8,630,965 B2 * | 1/2014 | Savvides et al. | 706/13 |
| 8,639,993 B2 * | 1/2014 | Strauss | 714/723 |
| 8,674,822 B2 * | 3/2014 | Priyantha et al. | 340/505 |
| 8,719,537 B2 * | 5/2014 | Loh et al. | 711/167 |
| 2004/0128347 A1 | 7/2004 | Mason et al. | |
| 2004/0203630 A1 | 10/2004 | Wang | |
| 2004/0205149 A1 | 10/2004 | Dillon et al. | |
| 2006/0277308 A1 | 12/2006 | Morse et al. | |
| 2008/0208789 A1 | 8/2008 | Almog | |
| 2010/0250335 A1 | 9/2010 | Cetin et al. | |
| 2012/0226888 A1 * | 9/2012 | Rychlik et al. | 711/207 |

OTHER PUBLICATIONS

Andraus, et al., "File Prefetching for Mobile Devices Using On-line Learning", Available at: http://www.eecs.umich.edu/~zandrawi/Andraus_Unpublished_PrefetchPrediction.pdf, Retrieved on Oct. 5, 2011, 10 pages.

Adya, et al., "Analyzing the Browse Patterns of Mobile Clients", Available at: http://www.cs.utexas.edu/~lili/papers/pub/IMW2001.pdf, in Proceedings of the 1st ACM SIGCOMM Workshop on Internet Measurement, 2001, 6 pages.

(Continued)

*Primary Examiner* — Michael B Holmes
(74) *Attorney, Agent, or Firm* — Steve Wight; Judy Yee; Micky Minhas (57) ABSTRACT

The subject disclosure is directed towards a technology that timely pre-fetches content to a computing device based upon a prediction that a user will be requesting access to the content. Features comprising temporal features, spatial features, spatiotemporal features and/or other features associated with content are provided to a model trained at least in part with historical access data. The model returns information from which a determination of whether to pre-fetch the content is made.

20 Claims, 5 Drawing Sheets

(56) References Cited

OTHER PUBLICATIONS

Armstrong, et al., "Efficient and Transparent Dynamic Content Updates for Mobile Clients", Available at: http://www.usenix.org/events/mobisys06/full_papers/p56-armstrong.pdf, MobiSys '06, Jun. 19-22, 2006, Uppsala, Sweden, pp. 56-68.

Balasubramanian, et al., "Enhancing Interactive Web Applications in Hybrid Networks", Available at: http://skuld.cs.umass.edu/traces/network/dieselnet-fall2007-ap/mobicom.pdf, MobiCom '08, Sep. 14-19, 2008, San Francisco, California, USA, 11 pages.

Balasubramanian, et al., "Energy Consumption in Mobile Phones: A Measurement Study and Implications for Network Applications" Available at: http://citeseerx.ist.psu.edu/viewdoc/download?doi=10.1.1.154.6444&rep=rep1&type=pdf, IMC '09, Nov. 4-6, 2009, Chicago, Illinois, USA, 17 pages.

Barford, et al., "Changes in Web Client Access Patterns: Characteristics and Caching Implications" Available at: http://citeseerx.ist.psu.edu/viewdoc/download;jsessionid=67C45356FB6FDA1006BF24124D020304?doi=10.1.1.56.7552&rep=rep1&type=pdf, World Wide Web, 2(1-2): 15-28, 1999, 30 pages.

Cunha, et al., "Characteristics of WWW Client-based Traces" Available at: http://citeseerx.ist.psu.edu/viewdoc/download?doi=10.1.1.36.1313&rep=rep1&type=pdf, Technical Report TR-95-010, Jul. 18, 1995, 18 pages.

Duchamp, Dan, "Prefetching Hyperlinks" Available at: http://citeseerx.ist.psu.edu/viewdoc/download?doi=10.1.1.77.110&rep=rep1&type=pdf, in Proceedings of USITS '99, The 2nd USENIX Symposium on Internet Technologies & Systems, Oct. 11-14, 1999, 13 pages.

Friedman, Jerome H., "Stochastic Gradient Boosting" Available at: http://www.salford-systems.com/doc/StochasticBoostingSS.pdf, Comput. Stat. Data Anal., Mar. 26, 1999, 10 pages.

Jiang, et al., "Web Prefetching in a Mobile Environment" Available at: http://citeseerx.ist.psu.edu/viewdoc/download?doi=10.1.1.15.3576&rep=rep1&type=pdf, IEEE Personal Communications, Oct. 1998, pp. 25-34.

Khalil, et al., "Integrating Recommendation Models for Improved Web Page Prediction Accuracy" Available at: http://crpit.com/confpapers/CRPITV74Khalil.pdf, in 31st Australasian Computer Science Conference, 2008, 10 pages.

Komninos, et al., "A calendar based internet content pre-caching agent for small computing devices" Available at: http://www.buccleuchpark.net/MUCOM/publi/KD_Precache.pdf, Journal of Personal and Ubiquitous Computing,12 (7), 2008, 15 pages.

Markatos, et al., "A Top-10 Approach to Prefetching on the Web" Available at: http://citeseerist.psu.edu/viewdock/download?doi=10.1.1.33.2057&rep=rep1&type=pdf, in Proceedings of INET, 1998,15 pages.

"Mongoose Metrics. Mobile Devices Surpass Desktop Web Browsing in Five to Ten Years", Available at: http://www.mongoosemetrics.com/press_05012010.php, May 1, 2010.

Nanopoulos, et al., "A Data Mining Algorithm for Generalized Web Prefetching" Available at: http://citeseerx.ist.psu.edu/viewdoc/download?doi=10.1.1.11.602&rep=rep1&type=pdf, IEEE Transactions on Knowledge and Data Engineering, vol. 15, No. 5, Sep./Oct. 2003, pp. 1155-1169.

Padmanabhan, et al., "Using Predictive Prefetching to Improve World Wide Web Latency" Available at: http://citeseerx.ist.psu.edu/viewdoc/download?doi=10.1.1.99.2021&rep=rep1&type=pdf, SIGCOMM Comput. Commun. Rev., 26(3), 1996, 15 pages.

Padmanabhan, et al., "The Content and Access Dynamics of a Busy Web Site: Findings and Implications" Available at: http://conferences.sigcomm.org/sigcomm/2000/conf/paper/sigcomm2000-3-3.pdf, SIGCOMM '00, Stockholm, Sweden, Aug. 2000, pp. 111-123.

Pitkow, et al., "Mining Longest Repeating Subsequences to Predict World Wide Web Surfing" Available at: http://www.usenix.net/publications/library/proceedings/usits99/full_papers/pitkow/pitkow.ps, in USENIX, 1999,12 pages.

Thawani, et al., "Context-aware Timely Information Delivery in Mobile Environments" Available at: http://citeseerx.ist.psu.edu/viewdoc/download?doi=10.1.1.116.206&rep=rep1&type=pdf, The Computer Journal, 50(4), Mar. 13, 2007, 13 pages.

Vartiainen, et al., "Auto-update: A Concept for Automatic Downloading of Web Content to a Mobile Device" Available at:http://www.nokiaresearch.com/files/autoupdate.pdf, in Proceedings of Mobility, 2007, 7 pages.

Wu, et al., "Ranking, Boosting, and Model Adaptation" Available at: http://citeseerx.ist.psu.edu/viewdoc/download?doi=10.1.1.159.3860&rep=rep1&type=pdf, Microsoft Research Technical Report MSR-TR-2008-109, Microsoft Research, Oct. 15, 2008, 18 pages.

Yin, et al., "Adaptive Power-aware Prefetch in Wireless Networks" Available at: http://citeseerx.ist.psu.edu/viewdoc/download?doi=10.1.1.61.1315&rep=rep1&type=pdf, IEEE Transactions on Wireless Communications, vol. 3, No. 5, Sep. 2004, pp. 1648-1658.

"International Search Report and Written Opinion" for PCT Application No. PCT/US2013/025794, Mailed Date: Jun. 2, 2013, Filed Date: Feb. 13, 2013, 11 pages.

Nair, et al., "Dynamic Web Pre-fetching Technique for Latency Reduction", International Conference on Computational Intelligence and Multimedia Applications, vol. 4, Dec. 13-15, 2007, pp. 202-206.

Zhou, et al., "Optimizing User Interaction for Web-Based Mobile Tasks", 2010 10th Annual International Symposium on Applications and the Internet, Jul. 19-23, 2010, pp. 68-76.

* cited by examiner

CONTENT PRE-FETCHING FOR COMPUTING DEVICES

BACKGROUND

Accessing remote content from computing devices, especially mobile computing devices, can be frustrating. Mobile devices connect to the internet through relatively slow cellular connections. For example, with contemporary technology, to download a web page on a cell phone may take on the order of a couple of seconds to establish a cell tower connection, followed by several more seconds/tens of seconds to perform the download.

It is generally not desirable to simply pre-fetch as much remote content as possible, as often as possible, to make it available locally. For one, remote content (e.g., web content) changes frequently, and thus pre-fetched content can quickly become stale, e.g., news and social network websites tend to change very often. For another, cell phones and mobile devices in general have limited battery and/or other resources, whereby attempting to continuously or fairly regularly update pre-fetched content on a mobile device can quickly drain the device's battery and render it unusable. Still further, some device users incur data download charges, which means they may pay for and/or use up their download size limits only to obtain stale content and/or a large amount of non-desired content.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a determination may be made as to whether to pre-fetch content to a computing device. Determining whether to pre-fetch may be based upon generating features comprising spatiotemporal and/or temporal-related feature data associated with the way a user accesses the web content and/or with the way the content itself is updated, providing the features to a model trained at least in part with historical access data, and obtaining information from the model indicative of whether to pre-fetch the content.

In one aspect, providing the features to the model may include inputting a feature vector into the model. The feature vector may include data representative of the temporal-related feature data, spatial-related feature data, spatiotemporal-related feature data, popularity-related data and/or context-related data (e.g., location).

In one aspect, a model that is trained based upon historical access data to predict whether to pre-fetch content is configured to receive as input a feature vector that represents a piece of content (e.g., a web page). The feature vector may include data representative of temporal-related feature data associated with when a user accesses that content and/or with the piece of content. The model processes the feature vector to output information indicative of whether a user is likely to request access to the content.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards providing a faster web browsing experience that intelligently pre-fetches content at appropriate times by anticipating a user's or application's likely future web accesses. The timely pre-fetching of remote content may be accomplished through the use of features, including spatial, temporal, spatiotemporal, popularity (favorites) and/or context-related features, that are used to determine which pieces of content (e.g., web page URLs) to pre-fetch, along with the timing of when to pre-fetch each piece of content. In one aspect and implementation, timely content pre-fetching is based upon solving a click prediction problem (whether the user will likely want to select pre-fetched content), by combining features including spatial, temporal, spatiotemporal, popularity (favorites) and/or context-related features to learn a user access model (e.g., a classifier) for determining the pieces of remote content to pre-fetch.

For example, based on the history of user accesses, a set of features is extracted that describes the way the user accesses remote content. Features that encode information about the sequence at which a user accesses the content may be extracted, along with features for the absolute and relative time at which these accesses take place, as well as the periodicity of these accesses. Using feature vectors from such historical access data, a click prediction model is trained in an offline phase, which provides a probability of the user accessing a specific piece of remote content at a given time, such as a URL. At an online, run time phase, the device leverages the click prediction model to find the probability of the user (or application) accessing the given piece of remote content, e.g., a specific webpage URL within the next time quantum of arbitrary length (or some time in the future). If the probability for that URL is higher than a predetermined threshold, the content corresponding to that URL is pre-fetched onto the mobile device.

It should be understood that any of the examples herein are non-limiting. For example, while a mobile device/smartphone are used as examples herein, at least some of the concepts described herein are applicable to a laptop computer, tablet computer, personal computer or the like. Further, while pre-fetching web content in the form of URLs for a browser is used as one example, any downloaded content (e.g., applications and/or application content) may be pre-loaded and/or pre-fetched based upon the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and content access in general.

Figure 1:
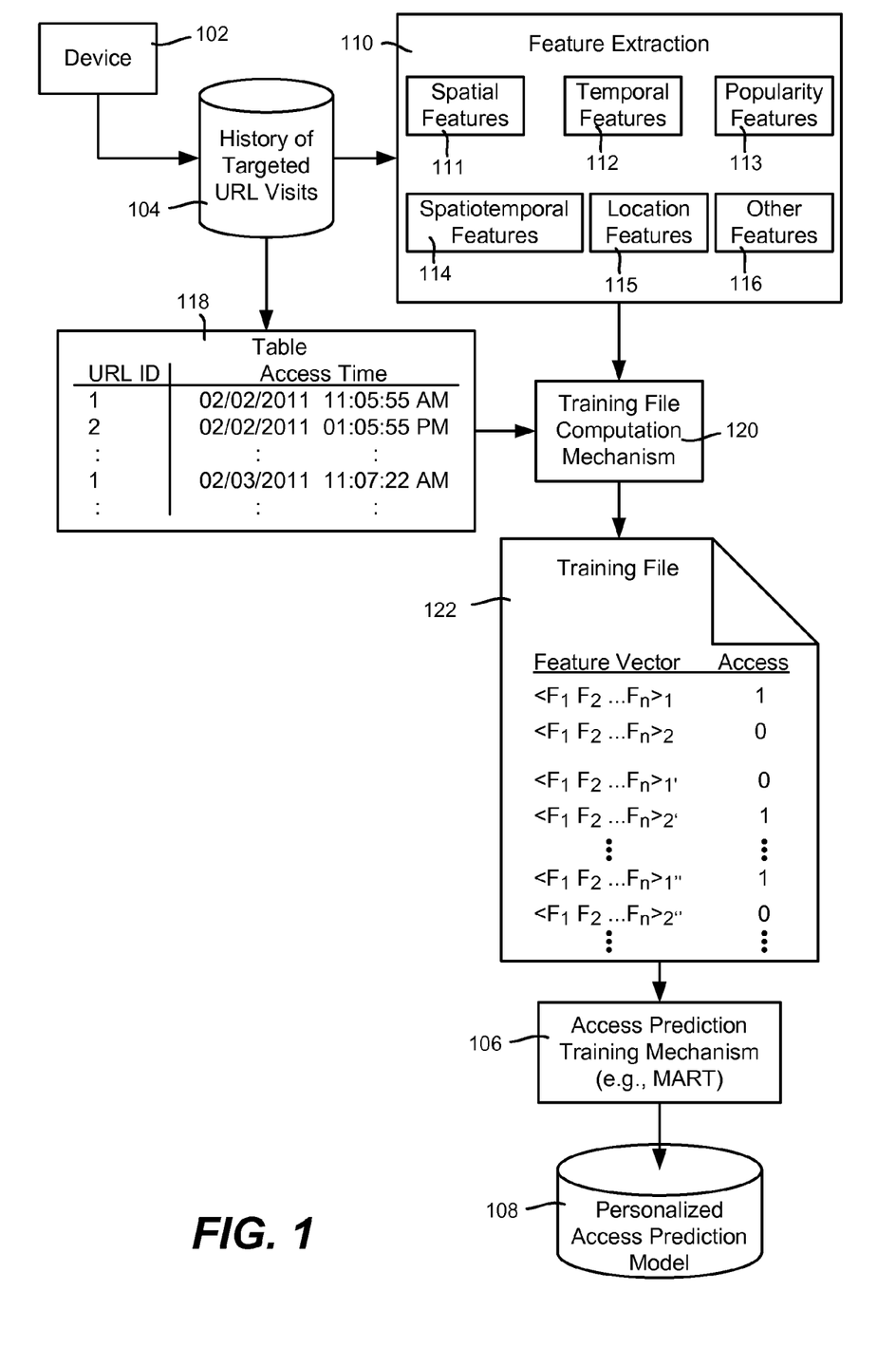
FIG. 1 is a block diagram representing example components for training a model that predicts whether a user is likely to access a piece of content based on features extracted from historical access data.

FIG. 1 is a block diagram showing various components in one example implementation. In general, a mobile device 102 records user web accesses into a history data structure 104, which may be located on the device or in a remote storage location. The web accesses may include automatic page refreshes. Periodically (e.g., daily, weekly, monthly) or at some other appropriate event, an offline training mechanism 106 uses this information to build a web access prediction model 108 for the user.

The model 108 may be built on the mobile device itself, on a possibly more powerful machine such as the user's desktop, and/or by a service in the cloud, for example. Note that the history data structure 104, such as if maintained remotely (in the cloud, for example), may be assembled from multiple device accesses, e.g., a smartphone, a laptop, a tablet, and so on, to assist in data mining used for training of the model, as described below. Further, each such device may have its own model, with shared devices having multiple models, each mapped to a user. Data from different devices may be maintained in association with a device identifier, for example, so that different weights may be used as appropriate; e.g., access data collected from a laptop may not have the same weight as a smartphone's collected data in a model used by the smartphone.

To build/train the model 108, a feature extraction mechanism 110 extracts a set of features 111-116 for a set of "targeted" URLs identified from the history data structure 104, e.g., corresponding to a user's web logs as represented via the table 118 in FIG. 1. As used herein, "targeted" URLs refer to a user's frequently visited URLs (typically a relatively small number of them, such as ten or less), as opposed to "untargeted" URLs which are relatively infrequently visited. For example, a targeted URL may be one that was visited by the user at least five times in a month; however, other thresholds, counts, time periods and so forth may be used to differentiate targeted versus untargeted URLs. The number of targeted URLs may also be proportional to the average number of URLs a user visits, e.g., on a daily or monthly basis. A user who visits thousands of (different) URLs every month may have a higher number of targeted URLs than a user that visits only a few hundred URLs a month. Note that the model predicts targeted web accesses, and as such in one implementation the feature vectors are generated only for targeted web accesses or non-accesses; however, the feature values encode information about both targeted and untargeted web accesses.

As described herein, the features 111-116 encode the underlying structure of mobile web browsing behavior (or other content accesses) in terms of spatial, temporal, spatiotemporal, popularity, location and/or possibly other properties. A training file computation mechanism 120 maps the data in the table 118 to a training file 122 (or other suitable data structure) comprising a set of feature vectors that are each annotated as an access or non-access. For example, whenever the user opens the browser program for a session (based on some user activity/events) or other duration, each targeted URL that was accessed during that session or duration has a feature vector annotated with an access of one (1), while each targeted URL that was not accessed during that session has a feature vector annotated with an access of zero (0).

Using the training file 122 as labeled feature vector traces, the training mechanism 106 trains the model 108 for that user. One such model (further described below) is a known model that leverages stochastic gradient boosting techniques, created as a decision tree that supports time ranges with probabilities (access probabilities in this technology) in its leaves. Other models/classifiers may be used in alternative implementations. In general, the training phase combines the different features provided as input to enable the model to maximize the number of correct predictions in a test data set.

Mobile web browsing behavior across users can vary greatly in the type and number of accessed URLs, as well as the timing of URL accesses. Thus, in one implementation the features are collected and used for the model per single user. However, it is understood that this is only one example implementation; as another example, different types of users may be identified by behavioral patterns, and clustered into different profile types, with information learned for one set of users of a given profile being applicable to other users of that profile, at least to some extent.

Figure 2:
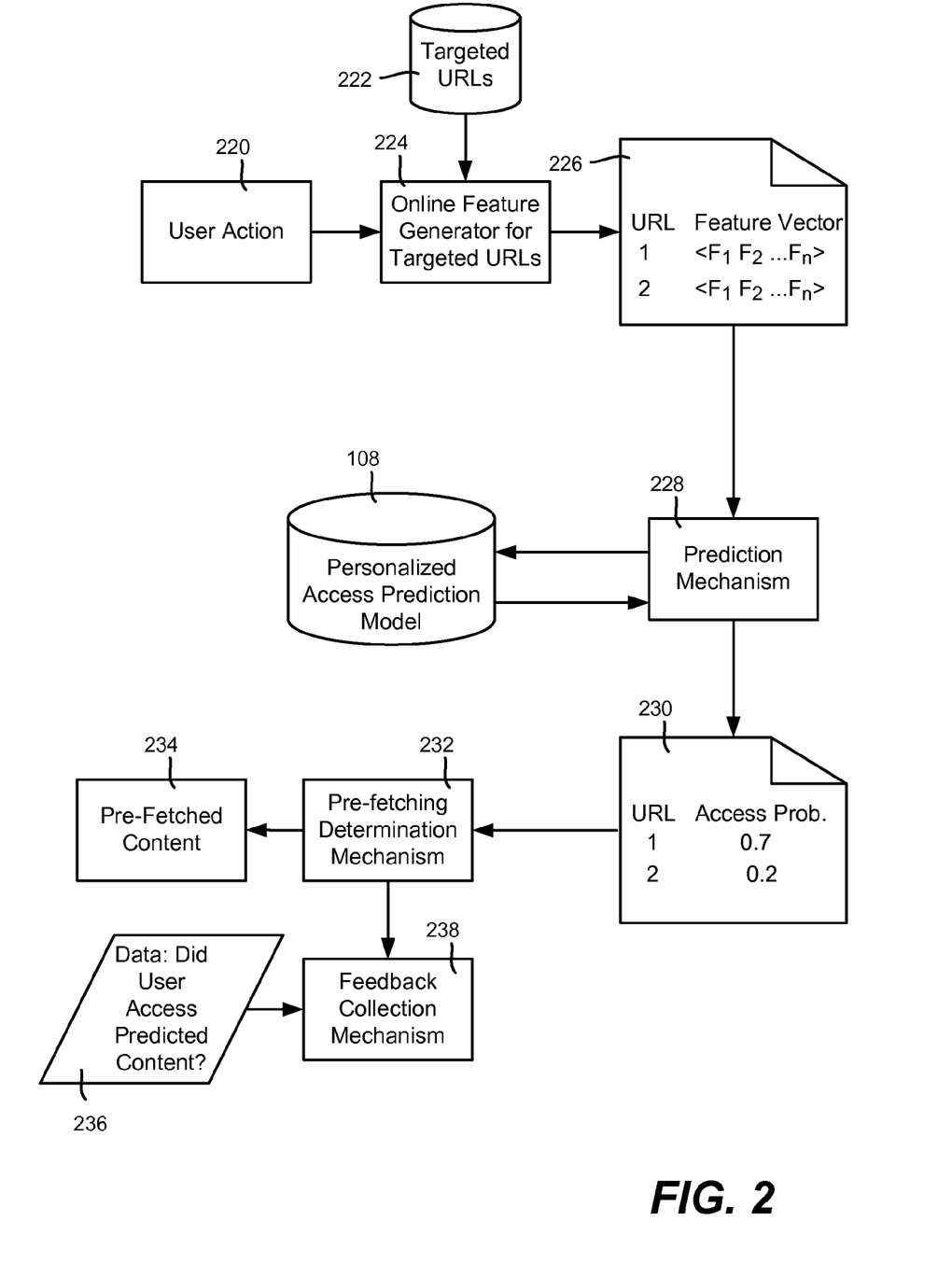
FIG. 2 is a block diagram representing example components for pre-fetching content that is identified by a model as likely being requested for access.

FIG. 2 represents the online usage of the model 108 (or a copied instance thereof). One of a set of user actions 220, such as unlocking the device, may trigger a prediction operation. Other actions that may trigger a prediction operation include when the user activates a browser, visits a URL, launches an application, when a scheduled event occurs, and so forth.

When triggered, a feature vector is generated for each targeted URL 222, as represented in FIG. 2 via the online feature generator 224 and set of feature vectors 226. The prediction model 108 is invoked with each of these feature vectors as input, as represented by the set of vectors 226 being fed as input to the prediction model 108 by a prediction mechanism 228. Note that the model may be incorporated into a program that uses it such as a browser (or as an add-on), and/or may be configured with an API, as a service, and/or in some other way so as to be accessible by external programs that seek a pre-fetching prediction regarding user access, as well as for training a model for their purposes.

For each of the feature vectors and corresponding targeted URLs, the model assigns an access probability, as presented by the URL-access probability set 230. Depending on these resulting probabilities as evaluated against a pre-configured threshold probability, e.g., as evaluated by a pre-fetching determination mechanism 232, none, one or more targeted URLs are fetched. Note that content pre-fetching may include pre-fetching the web page content along with any associated images, cascading style sheets, java script, and so forth. This is represented in FIG. 2 as pre-fetched content 234. Moreover, in one implementation, a proxy or any other remote machine operating between the Web server and the device may keep track of the Web content the device recently cached thus being able to push only new content (e.g., the difference between the new content and the previously cached content), thus saving communication bandwidth. Thereafter, if the user requests a URL corresponding to pre-fetched content, the requested content is rapidly made available, as it has been pre-fetched to the device, e.g., to a suitable browser cache or into a program's storage space.

The pre-configured threshold probability may change based on one of possibly many combined factors, and may be user configurable. For example, a higher threshold may be used when battery power is low. The threshold may be based upon data plan limits, type of current access (e.g., Wi-Fi or cellular), type of device, time of day, location, whether the user appears to be driving, and so forth.

As also represented in FIG. 2 via block 236, whether the user clicks or does not click any pre-fetched URL may be collected by a suitable mechanism 238 as feedback to help improve/better tune the prediction model. In addition to use the feedback in training to tune the model based upon actual results of how well the prediction did, the feedback may be used in other ways, e.g., the threshold probability that needs to be met for pre-fetching to occur may be varied based upon such feedback.

Turning to the features, users tend to access URLs in well-defined behavioral patterns. One pattern is that users often visit a small set of web pages from their phones, which they tend to repeatedly visit over time, that is, a small number of targeted URLs is responsible for the majority of a given user's URL visits. Another pattern is that user accesses are often periodic and happen at given (and typically relatively short) time windows, e.g., every thirty minutes, when users wake up, during an afternoon break, and/or the like. Further, users often access content in bursts. For example, when a user checks the news, that user may also check the weather forecast and current stock prices. Moreover, untargeted URL accesses tend to be significantly more clustered in time than targeted URL accesses, whereby recent untargeted URL accesses may help predict the type of future URL accesses (targeted vs. untargeted).

Thus, URL accesses exhibit temporal properties that may be used in predicting content to pre-fetch in a timely manner (where timely generally refers to in advance, but not so far in advance that the content remains reasonably fresh/non-stale). Note that in contrast, pre-fetching based on past sequences (or, more generally, sets) of web accesses may be inefficient.

As described herein, predictive features may be based upon concepts such as a spatial parameter (e.g., the previously accessed URL), a temporal parameter (e.g., time of day), and a spatiotemporal parameter (e.g., time since this URL was last accessed). Another feature subset includes one or more popularity-related features (e.g., how popular this URL across the full set of accessed URLs), in conjunction with a label that records the user's action. Still other feature types, including context-related features such as whether a user is at home or in the office (e.g., as determined by GPS coordinates or cell tower positioning) may also improve prediction accuracy.

The following table describes some example features; as can be appreciated, other features may be used in addition to, or instead of these example features:

| Feature Class | Feature name | Definition |
| --- | --- | --- |
| spatial | $t_i$_Targeted (for k features, one per targeted URL) | whether the previous access was to the targeted URL $t_i$, for i ∈ [1, k] |
| | Untargeted | whether the previous access was an access to an untargeted URL |
| temporal | TimeOfDay | time of day at which the access occurred |
| | AvgTime | average access time over the accesses to the same targeted URL $t_x$ |
| | TimeStdev | standard deviation over the access times for the same targeted URL $t_x$ (consistency) |
| | Weekend | whether the access happened during a weekend |
| spatio-temporal | TimeSinceTargeted | time elapsed since any targeted URL was last accessed |
| | $t_i$_TimeSinceTargeted (for k features, one per targeted URL) | time elapsed since the targeted URL ti was last accessed, for i ∈ [1, k] |
| | TimeSinceUntargeted | time elapsed since any untargeted URL was last accessed |
| | TimeSinceAccess | time elapsed since the targeted URL $t_x$ was last accessed |
| | AvgInterAccessTime | average time between two consecutive accesses to the targeted URL $t_x$ |
| | InterAccessTimeStdev | standard deviation of inter-access times for the targeted URL $t_x$ (consistency) |
| popularity | PopAmongTargeted | popularity of the targeted URL $t_x$ over k targeted URLs |
| | PopAmongAll | popularity of the targeted URL $t_x$ over the set of targeted and untargeted URLs |

Feature generation provides accurate and discriminative information regarding the mobile web browsing behavior of individual users. As described herein, mobile web browsing behavior exhibits spatial, temporal, and spatiotemporal structure, which is reflected in the example feature set. These features tend to help the model decide what targeted URL to pre-fetch, and when, thus enabling timely pre-fetches. In this example, for a user with k targeted URLs, 2×k+11 features are computed.

In general, the spatial features encode sets of mobile web accesses accessed together, and record information about the immediately previously accessed URL (e.g., that it was to an untargeted URL, or to which targeted URL was accessed). Alternative spatial features may be based upon more than the one immediately previously accessed URL, for example.

The temporal features generally record the periodicity and time-based data of targeted web accesses, and the time of day and/or day of the week in which these accesses occur. Other temporal features, or additional temporally features, also may be used.

In general, the spatiotemporal features combine spatial and temporal properties to encode further information. For example, the spatiotemporal features may encode the time elapsed between a targeted URL access and the immediately previous access. Alternative spatiotemporal features may be based upon more than the one immediately previously accessed URL, for example.

In general, popularity features encode the popularity of each targeted URL, and can be used to decide which targeted URLs will be most likely accessed. Popularity features are based upon the observation that for most users, the number of targeted URLs varies from one to ten, but usually only two or three of the targeted URLs are responsible for most targeted URL accesses. Context features may be used to reflect access patterns of a user based upon the user's location, e.g., a user may be more likely to access a traffic website when at work in the late afternoon, but not when at home in the late afternoon.

Figure 3:
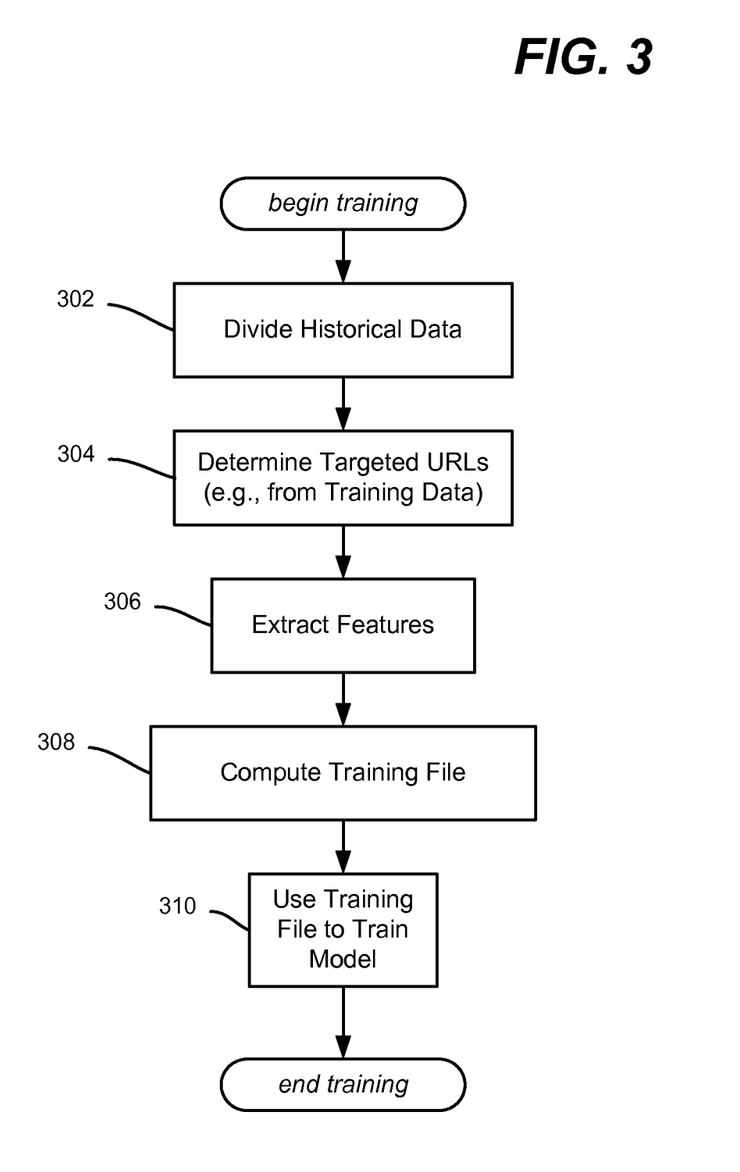
FIG. 3 is a flow diagram representing example steps for training a model that predicts whether a user is likely to access a piece of content.

FIG. 3 summarizes various aspects of training, based upon the concept of pre-fetching content as a (e.g., binary) access prediction problem. In one implementation, web logs may be divided into training, validation and test data, (step 302, as is generally known in machine learning), such as seventy percent training, ten percent validation, twenty percent test data. The training data is processed at step 304 to identify the targeted URLs of the user, e.g., those URLs that have been accessed at least five times a month. Other ways to divide and/or use the historical data may be employed.

Prediction may be based upon stochastic gradient boosting techniques, in which modeling consumes features (extracted at step 306 and processed into a training file at step 308) and uses their dependencies to maximize access prediction without being limited by the nature of the modeling tool (e.g., a Markov model). One such learning tool is MART, (based on Multiple Additive Regression Trees).

In one implementation, after having identified the targeted URLs, the training, validation and test data may be generated as follows. Starting from the first web access in the logs, the user's web accesses are divided into multiple access epochs, each having some suitable duration, e.g., five minutes. For each access epoch, the feature vectors are computed, one for each targeted URL. The vectors for targeted URLs accessed in the epoch are labeled as accessed, and the other vectors are labeled as non-accessed. In one implementation, if a targeted URL is accessed multiple times within an epoch, only one feature vector is computed for the first access to that URL within the epoch, which biases the model towards the first access to improve timeliness. The duration of the access epoch defines the freshness of the prediction, and, may be referred to as the freshness threshold. Whenever a prediction is made in the beginning of an access epoch and a URL is pre-fetched, its content is considered fresh for the duration of the access epoch. In that way, the web content update rate is less than one update per duration.

To construct the predictive model, MART takes the historical data on web accesses as input, which is partitioned into training and validation sets; the training data set is used to build the model, while the validation set is used to provide an unbiased error estimate. As represented by step 310, the labeled feature vectors in the training file are used offline to train the access prediction model. Gradient descent may be used as the optimization technique, with binary decision trees used as the fitting function. After each training phase, MART reports a relative ordering of the features, which indicates the relative feature importance with respect to making a prediction, e.g., the larger the number of decision tree branches associated to a feature, the higher the importance of that feature.

Labeled feature vectors in the test data set may be used to evaluate the performance of the model. For example, for each feature vector in a test file, the access probability is retrieved from the model. An access probability higher than 0.5 corresponds to pre-fetching the targeted URL (this probability threshold may be adjusted dynamically depending on various criteria such as network and battery conditions). The success or not of the prediction depends on the label of the feature vector in the test file. If the label is marked as accessed, the pre-fetching was successful, otherwise the pre-fetching was unsuccessful.

Figure 4:
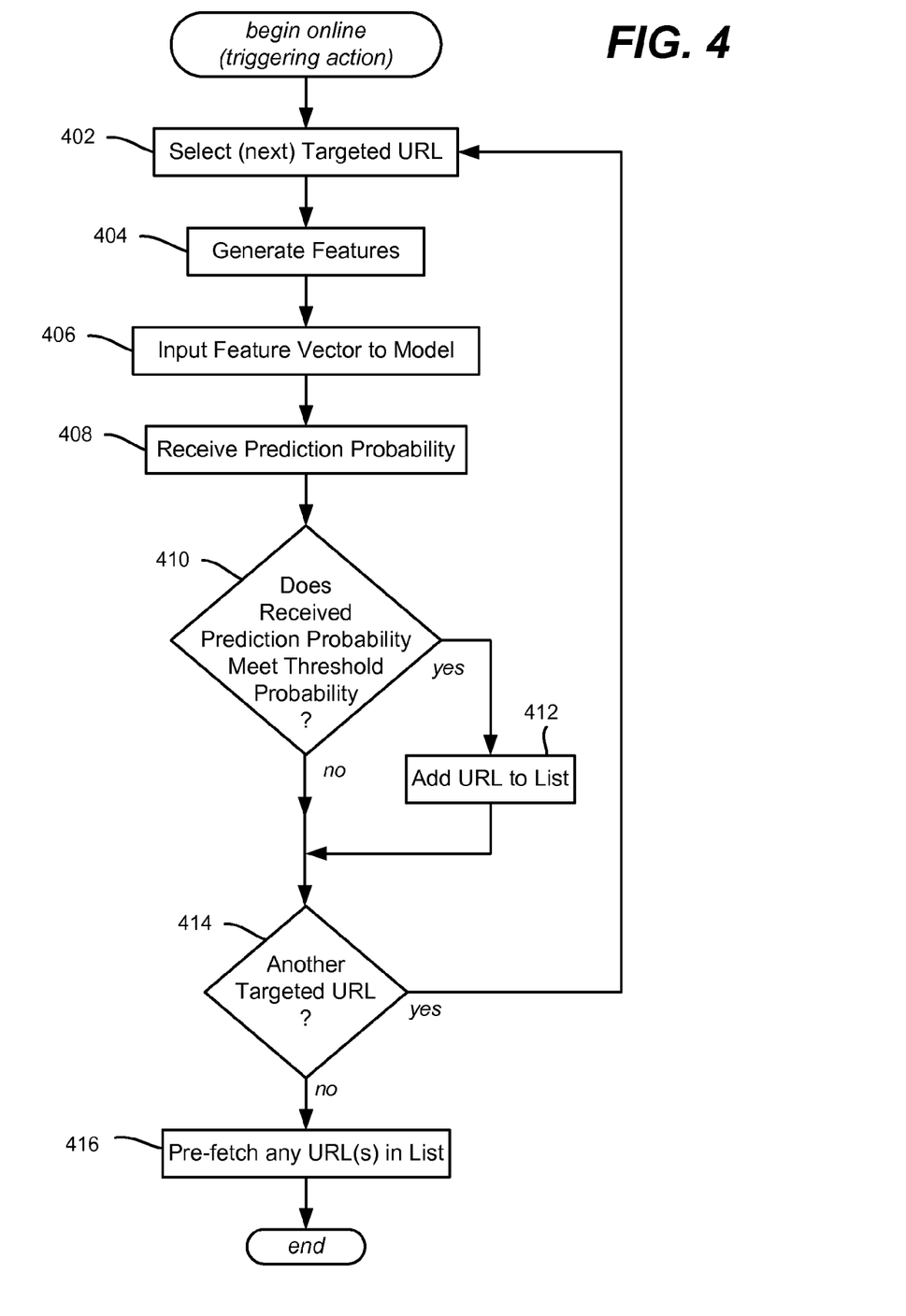
FIG. 4 is a flow diagram representing example steps for timely pre-fetching content upon evaluating whether a model predicts that the content is likely to be requested.

FIG. 4 summarizes the online usage of the model as described herein, namely by the web access prediction model whose role is to assign, at any given time, an access probability to each targeted URL. The higher the probability, the more likely the user is to request access to this URL. Note that to determine when the mobile device should make a web access prediction, the example steps of FIG. 4 are triggered by an event-driven approach in which the mobile device makes web access predictions as a result of certain user actions (in contrast to web search, where the user explicitly submits a query).

When triggered, step 402 represents selecting one of the targeted URLs. Note that it is feasible to decouple the set of targeted URLs used for online pre-fetching from the set used for offline training. For example, offline training may be performed monthly to build the model, however targeted URLs that are considered with respect to evaluation for pre-fetching may be configured more often, including possibly updating counts or the like whenever a given URL is accessed.

Step 404 generates the features for the targeted URL that was selected at step 402, which are combined into a feature vector. The feature vector is input into the trained model as represented by step 406.

Step 408 represents receiving the prediction probability from the model, which is evaluated against the threshold probability at step 410. If met, the URL is added to a pre-fetching list or other suitable data structure at step 412. Note that it is feasible to instead pre-fetch the content corresponding to the URL at this moment, however efficiency (such as radio energy savings) may be gained from batching multiple URLs, and thus in one implementation such a list is first built.

Step 414 repeats the process for each targeted URL. When there are no more to process, step 416 pre-fetches any URL that is in the list.

While the above example was mostly described in the context of pre-fetching web content for output by a user's browser program, other mechanisms may use the technology in a similar manner. For example, a device may launch an application, which may or may not pre-fetch content, based upon a model that predicts the user's actions based upon historical usage/access patterns. In this way, for example, an application may be pre-loaded into memory to start faster. As another example, a user who regularly runs an application that gets the weather forecast every morning when he or she wakes up is able to have the application automatically launched and/or the content for that application pre-fetched based upon previous access patterns (and a triggering event, which may be the time of day or powering up the device).

As can be seen, performed is a data-driven content pre-fetching technology that is based upon the temporal, spatial, and/or spatiotemporal patterns of each individual user's web browsing or other content access behavior, which facilitates accurate content pre-fetching. By predicting users' accesses, a faster web browsing or other device experience is provided, with the same or lower radio energy dissipation.

Example Operating Environment

Figure 5:
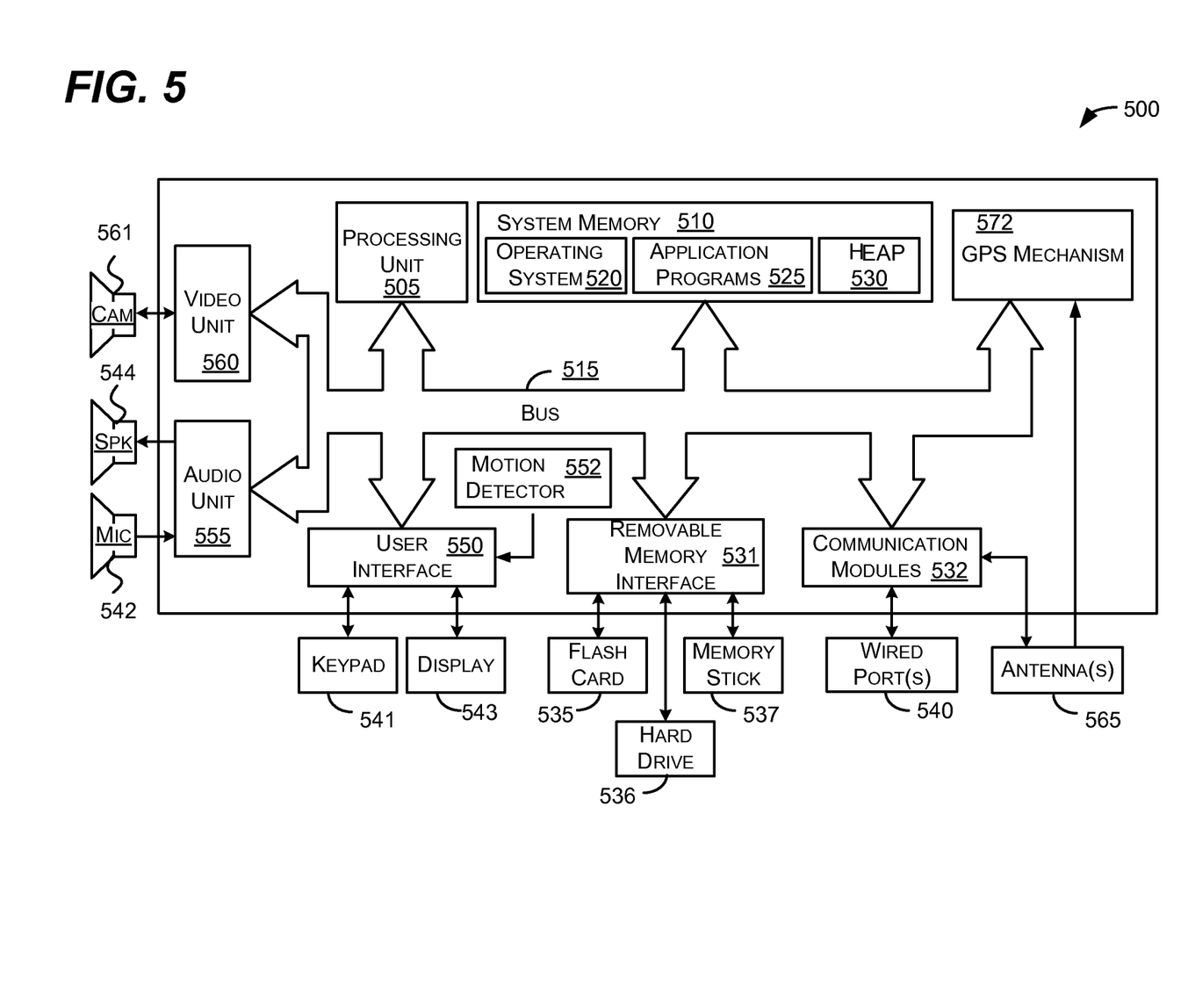
FIG. 5 is a block diagram representing an example non-limiting computing system or operating environment, e.g., in the example of a mobile phone device, in which one or more aspects of various embodiments described herein can be implemented.

FIG. 5 illustrates an example of a suitable mobile device 500 on which aspects of the subject matter described herein may be implemented. The mobile device 500 is only one example of a device and is not intended to suggest any limitation as to the scope of use or functionality of aspects of the subject matter described herein, e.g., a personal computer that is not ordinarily considered mobile may benefit from the technology described herein. Neither should the mobile device 500 be interpreted as having any dependency or requirement relating to any one or combination of components illustrated in the example mobile device 500.

With reference to FIG. 5, an example device for implementing aspects of the subject matter described herein includes a mobile device 500. In some embodiments, the mobile device 500 comprises a cell phone, a handheld device that allows voice communications with others, some other voice communications device, or the like. In these embodiments, the mobile device 500 may be equipped with a camera for taking pictures, although this may not be required in other embodiments. In other embodiments, the mobile device 500 may comprise a personal digital assistant (PDA), hand-held gaming device, notebook computer, printer, appliance including a set-top, media center, or other appliance, other mobile devices, or the like. In yet other embodiments, the mobile device 500 may comprise devices that are generally considered non-mobile such as personal computers, servers, or the like.

Components of the mobile device 500 may include, but are not limited to, a processing unit 505, system memory 510, and a bus 515 that couples various system components including the system memory 510 to the processing unit 505. The bus 515 may include any of several types of bus structures including a memory bus, memory controller, a peripheral bus, and a local bus using any of a variety of bus architectures, and the like. The bus 515 allows data to be transmitted between various components of the mobile device 500.

The mobile device 500 may include a variety of computer-readable media. Computer-readable media can be any available media that can be accessed by the mobile device 500 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 500.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 510 includes computer storage media in the form of volatile and/or nonvolatile memory and may include read only memory (ROM) and random access memory (RAM). On a mobile device such as a cell phone, operating system code 520 is sometimes included in ROM although, in other embodiments, this is not required. Similarly, application programs 525 are often placed in RAM although again, in other embodiments, application programs may be placed in ROM or in other computer-readable memory. The heap 530 provides memory for state associated with the operating system 520 and the application programs 525. For example, the operating system 520 and application programs 525 may store variables and data structures in the heap 530 during their operations.

The mobile device 500 may also include other removable/non-removable, volatile/nonvolatile memory. By way of example, FIG. 5 illustrates a flash card 535, a hard disk drive 536, and a memory stick 537. The hard disk drive 536 may be miniaturized to fit in a memory slot, for example. The mobile device 500 may interface with these types of non-volatile removable memory via a removable memory interface 531, or may be connected via a universal serial bus (USB), IEEE 5394, one or more of the wired port(s) 540, or antenna(s) 565. In these embodiments, the removable memory devices 535-937 may interface with the mobile device via the communications module(s) 532. In some embodiments, not all of these types of memory may be included on a single mobile device. In other embodiments, one or more of these and other types of removable memory may be included on a single mobile device.

In some embodiments, the hard disk drive 536 may be connected in such a way as to be more permanently attached to the mobile device 500. For example, the hard disk drive 536 may be connected to an interface such as parallel advanced technology attachment (PATA), serial advanced technology attachment (SATA) or otherwise, which may be connected to the bus 515. In such embodiments, removing the hard drive may involve removing a cover of the mobile device 500 and removing screws or other fasteners that connect the hard drive 536 to support structures within the mobile device 500.

The removable memory devices 535-937 and their associated computer storage media, discussed above and illustrated in FIG. 5, provide storage of computer-readable instructions, program modules, data structures, and other data for the mobile device 500. For example, the removable memory device or devices 535-937 may store images taken by the mobile device 500, voice recordings, contact information, programs, data for the programs and so forth.

A user may enter commands and information into the mobile device 500 through input devices such as a key pad 541 and the microphone 542. In some embodiments, the display 543 may be touch-sensitive screen and may allow a user to enter commands and information thereon. The key pad 541 and display 543 may be connected to the processing unit 505 through a user input interface 550 that is coupled to the bus 515, but may also be connected by other interface and bus structures, such as the communications module(s) 532 and wired port(s) 540. Motion detection 552 or other sensors such as accelerometers can be used to determine gestures made with the device 500.

A user may communicate with other users via speaking into the microphone 542 and via text messages that are entered on the key pad 541 or a touch sensitive display 543, for example. The audio unit 555 may provide electrical signals to drive the speaker 544 as well as receive and digitize audio signals received from the microphone 542.

The mobile device 500 may include a video unit 560 that provides signals to drive a camera 561. The video unit 560 may also receive images obtained by the camera 561 and provide these images to the processing unit 505 and/or memory included on the mobile device 500. The images obtained by the camera 561 may comprise video, one or more images that do not form a video, or some combination thereof.

The communication module(s) 532 may provide signals to and receive signals from one or more antenna(s) 565. One of the antenna(s) 565 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 572. In turn, the GPS mechanism 572 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 500 may connect to one or more remote devices. The remote devices may include a personal computer, a server, a router, a network PC, a cell phone, a media playback device, a peer device or other common network node, and typically includes many or all of the elements described above relative to the mobile device 500.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor, comprising: determining whether to pre-fetch content to a computing device, including generating features comprising temporal-related feature data associated with the content, providing the features as a feature vector input into a model trained at least in part with historical access data, and obtaining information from the model indicative of whether to pre-fetch the content.

2. The method of claim 1 wherein the historical access data corresponds to a single user, and wherein a piece of content represented by the feature vector corresponds to a URL from a set of one or more URLs that are identified as targeted URLs based upon the historical access data of the user.

3. The method of claim 1 further comprising computing the feature vector including data representative of spatial-related feature data.

4. The method of claim 1 further comprising computing the feature vector including data representative of spatiotemporal-related feature data.

5. The method of claim 1 further comprising computing the feature vector including data representative of popularity-related feature data.

6. The method of claim 1 further comprising computing the feature vector including data representative of context-related feature data.

7. The method of claim 1 further comprising computing the feature vector including data representative of the temporal-related feature data, spatial-related feature data and spatiotemporal-related feature data.

8. The method of claim 1 wherein generating the features comprises processing a set of one or more URLs that are identified as targeted URLs based upon the historical access data.

9. The method of claim 1 wherein obtaining the information from the model indicative of whether to pre-fetch the content comprises receiving a predicted probability value, and further comprising, pre-fetching the content when the predicted probability value achieves a threshold probability value.

10. A system comprising, a model trained based upon historical access data to predict whether to pre-fetch content, the model configured to receive as input a feature vector that represents a piece of content, the feature vector including data representative of spatiotemporal-related feature data associated with the piece of content, the model further configured to process the feature vector to output information indicative of whether a user is likely to request timely access to the content.

11. The system of claim 10 wherein the model is run on a computing device to which content is pre-fetched.

12. The system of claim 10 wherein at least part of the historical access data model is maintained on a computing device to which content is pre-fetched.

13. The system of claim 10 wherein the historical access data corresponds to a single user, and wherein the piece of content corresponds to a URL from a set of one or more URLs that are identified as targeted URLs based upon the historical access data of the user.

14. The system of claim 10 wherein the feature vector further includes data representative of spatial-related feature data or temporal-related feature data, or both spatial-related feature data and temporal-related feature data.

15. The system of claim 10 wherein the feature vector further includes data representative of popularity-related feature data or context-related feature data, or both popularity-related feature data and context-related feature data.

16. The system of claim 10 wherein the model is further trained based upon feedback indicative of whether the user actually requested timely access to the content.

17. One or more computer-readable media having computer-executable instructions, which when executed perform steps, comprising:
    selecting a content identifier;
    generating a feature vector for the content identifier, the feature vector including temporal-related featured data, spatial-related feature data and spatiotemporal-related feature data associated with the content identifier;
    providing the feature vector to a model;
    receiving a prediction-related value from the model representative of the feature vector; and
    pre-fetching content corresponding to the content identifier to a computing device if the prediction-related value indicates that future access to the content is likely to be requested.

18. The one or more computer-readable media of claim 17 wherein pre-fetching the content comprises batching a request for the content with at least one other request for other content.

19. The one or more computer-readable media of claim 17 having further computer-executable instructions comprising, training the model based upon historical access data.

20. The one or more computer-readable media of claim 17 having further computer-executable instructions comprising, monitoring accuracy with respect to predicted results and actual results, and adjusting the pre-fetching based upon the monitoring.

\* \* \* \* \*